(12) United States Patent
Mayes

(10) Patent No.: US 8,049,528 B2
(45) Date of Patent: Nov. 1, 2011

(54) OPERATION OF AN ELECTRICAL DRIVE SYSTEM

(75) Inventor: Peter Richard Mayes, Bradford (GB)

(73) Assignee: Nidec SR Drives Ltd., North Yorkshire (GB)

( * ) Notice: Subject to any disclaimer, the term of this patent is extended or adjusted under 35 U.S.C. 154(b) by 698 days.

(21) Appl. No.: 12/004,775

(22) Filed: Dec. 21, 2007

(65) Prior Publication Data

US 2008/0150464 A1 Jun. 26, 2008

(30) Foreign Application Priority Data

Dec. 21, 2006 (GB) .................................. 0625637.4

(51) Int. Cl.
G01R 31/34 (2006.01)
(52) U.S. Cl. .................................................. 324/765.01
(58) Field of Classification Search .................... 324/772
See application file for complete search history.

(56) References Cited

U.S. PATENT DOCUMENTS 5,467,025 A * 11/1995 Ray ................................ 324/772
5,723,858 A 3/1998 Sugden
2004/0154859 A1 8/2004 Kawada et al.

FOREIGN PATENT DOCUMENTS

EP 1 655 831 A1 5/2006

OTHER PUBLICATIONS

Stephenson, et al., "The Characteristics, Design and Applications of Switched Reluctance Motors and Drives," PCIM '93 Conference & Exhibition, Nürnberg, Germany, Jun. 21-24, 1993, Title page and pp. 1-31, 33-34 and 35-68.
Miller, "Electronic Control of Switched Reluctance Machines," Newnes, Power Engineering Series, Great Britain, 2001, 2 title pages and pp. 92-97.
Ray, et al., "Sensorless Methods for Determining the Rotor Position of Switched Reluctance Motors," The European Power Electronics Association, 1993, pp. 7-13.
Partial Search Report dated Mar. 17, 2010, issued by the European Patent Office in European Application No. 07254985.0, 7 pages.
Kroschel, et al., "Sensor Fault Detection and Localization Using Decorrelation Methods", Sensors and Actuators A, vol. 25-27, 1991, pp. 43-50.
Salmasi, "Dual Estimators for Position and Current Sensorless SRM Drives Based on the Decomposed Model", 2005 International Conference on Electric Machines and Drives, Piscataway, New Jersey, IEEE, May 15, 2005, pp. 1103-1107.
Extended Search Report dated May 3, 2010, issued by the European Patent Office in European Application No. 07254985.0, 14 pages.

* cited by examiner

Primary Examiner — Roberto Velez
(74) Attorney, Agent, or Firm — Haynes and Boone, LLP

(57) ABSTRACT

An electrical drive system includes an electrical machine controlled by an electronic controller, which requires feedback of signals representing quantities associated with the operation of the electrical machine. These signals may represent, for example, flux, current and/or rotor position. The integrity of these signals is validated by setting suitable thresholds for the signals and confirming that both are present at the appropriate time.

18 Claims, 5 Drawing Sheets

OPERATION OF AN ELECTRICAL DRIVE SYSTEM

This invention relates to validating signals used in the operation of an electrical drive, for example a drive including an electrical machine controlled by an electronic controller. In particular, it relates to the validation of the feedback signals used to control the excitation applied to the machine.

For some considerable time, the availability of easily controlled semi-conductor switches has enabled electronic control of many types of electrical machine and hence has provided drive systems whose speed is controlled by the user, rather than by the frequency of the electrical supply. All of these controllers rely, to a greater or lesser extent, on feedback signals of some sort. The parameters chosen for feedback are more likely to relate to the type of electrical machine being controlled, rather than to the application to which the machine is put, since different types of machines require different control methods.

The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference. A general treatment of the drives can be found in various textbooks, e.g. "Electronic Control of Switched Reluctance Machines" by T J E Miller, Newnes, 2001, incorporated herein by reference. The machines are characterised by a singly excited, doubly salient magnetic structure which is typically free from hard magnetic material.

Figure 1:
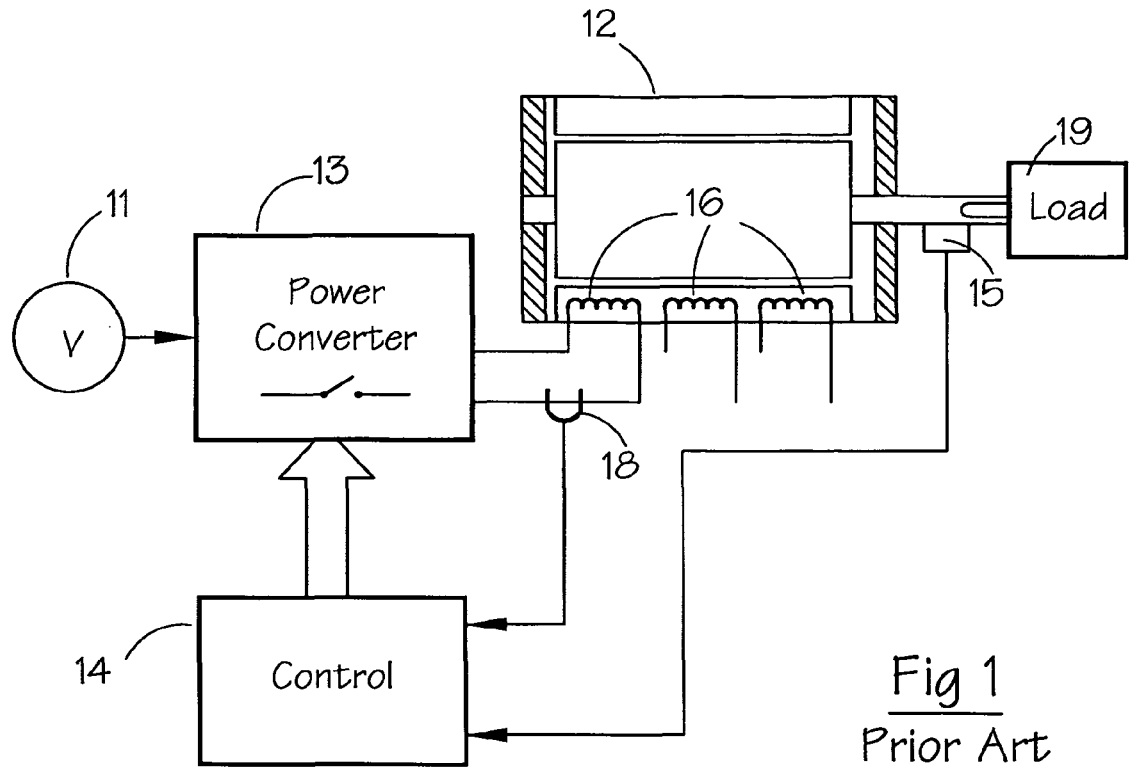

FIG. 1 of the drawings shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronised to the angle of rotation of the rotor for proper operation of the drive, and a rotor position detector 15 is typically employed to supply signals corresponding to the angular position of the rotor. The importance of accurate knowledge of the rotor position has encouraged the development of techniques for validation of the position feedback signals, e.g., as described in U.S. Pat. No. 5,723,858, incorporated herein by reference, where sequences of digital information are monitored to validate the integrity of the signal.

Figure 2:
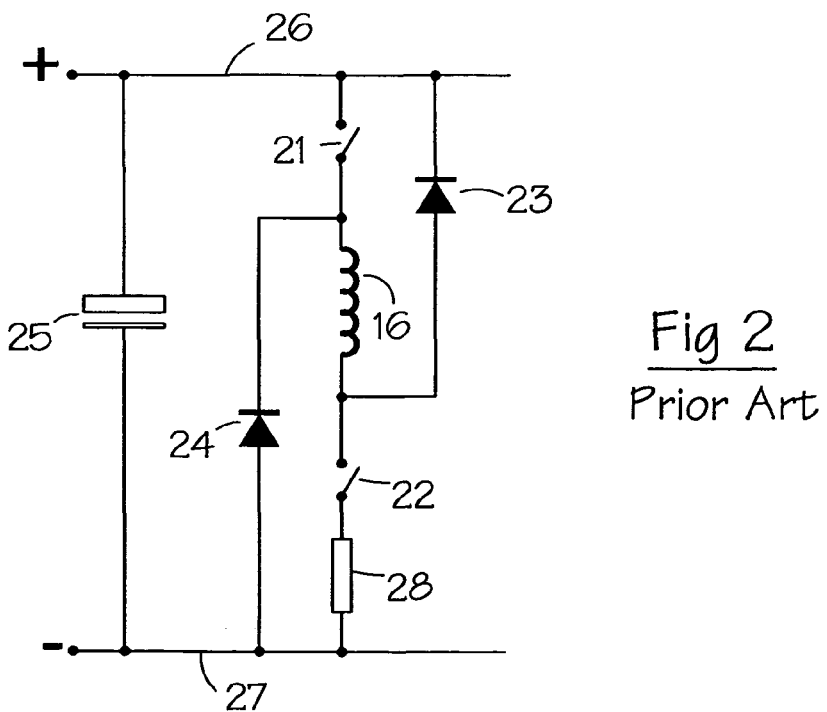

Many different power converter topologies are known, several of which are discussed in the Stephenson paper cited above. One of the most common configurations is shown in FIG. 2 for a single phase of a polyphase system. The phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

Current feedback from the machine to the converter is generally considered essential for safe operation of the controller, and a number of techniques are known in the art. In FIG. 2, a resistor 28 is connected in series with the lower switch 22 to provide a signal. Similar arrangements place the resistor in other parts of the circuit to give measurements of slightly different currents, but all of these provide a signal which is not electrically isolated from the main converter circuit. Alternatively, an isolated form of current transducer, as shown at 18 in FIG. 1, can be used to provide a signal which is generally easier to use in the control system.

A polyphase system typically uses several of the "phase legs" of FIG. 2, each consisting of switch and diode pairs around each phase winding, connected in parallel to energise the phases of the electrical machine. The phase inductance cycle of a switched reluctance machine is the period of the variation of inductance for the, or each, phase, for example between maxima when the rotor poles and the relevant respective stator poles are fully aligned. The voltage is applied for the duration of the conduction angle $\theta_c$ when the switches 21 and 22 are closed. The flux, which is the time integral of the applied voltage, rises almost linearly while the voltage is applied. The current in the phase winding 16 rises to a peak and then, depending on the operating point, falls. At the end of the conduction period, the switches are opened and the current transfers to the diodes, placing the inverted link voltage across the winding and hence forcing down the flux and the current to zero. At zero current, the diodes cease to conduct and the circuit is inactive until the start of a subsequent conduction period of that phase.

Various methods for dispensing with the rotor position transducer have been proposed. Several of these are reviewed in "Sensorless Methods for Determining the Rotor Position of Switched Reluctance Motors" by W F Ray and I H Al-Bahadly, published in the Proceedings of The European Power Electronics Conference, Brighton, UK, 13-16 Sep. 1993, Vol. 6, pp 7-13, incorporated herein by reference. Some of these methods proposed for rotor position estimation in an electrically driven machine use the measurement of one or more machine parameters from which other values can be derived. For example, phase flux-linkage (i.e. the integral of applied voltage with respect to time) and current in one or more phases can be monitored (e.g. by current transducer 18 in FIG. 1 or 28 in FIG. 2). Position is calculated using knowledge of the variation in inductance or flux-linkage of the machine as a function of angle and current.

Figure 3:
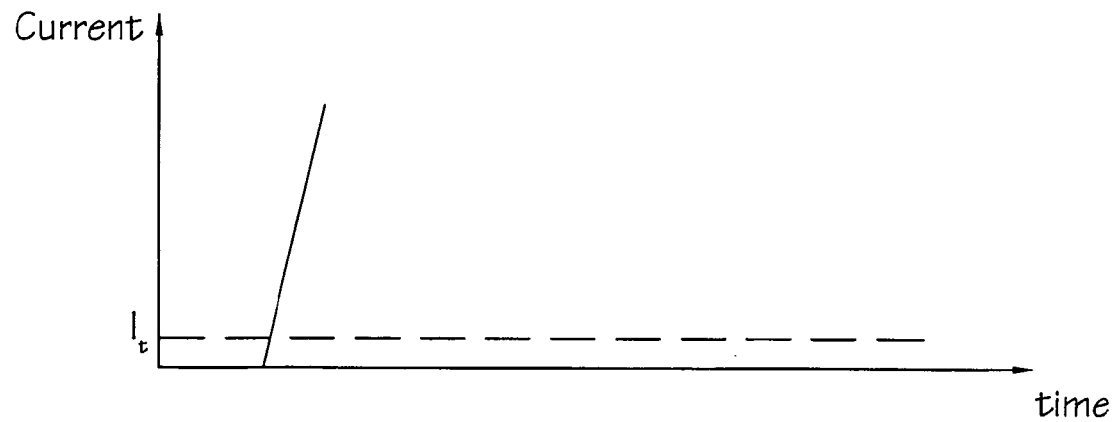
Figure 4:
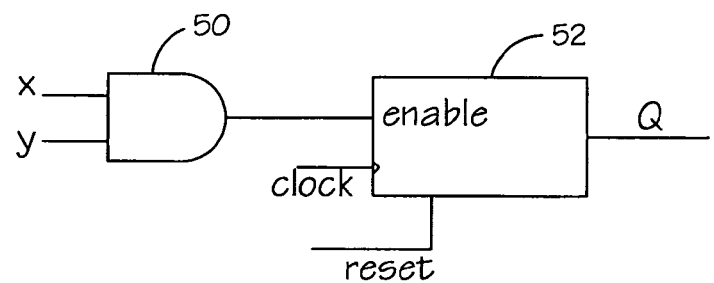

Whatever method is used, it is essential that the current and flux signals are accurate and reliable. A fault in a current transducer or a broken wire in the feedback path can have serious consequences for the controller. To attempt to provide protection against this, a failure detection method has been proposed as shown in FIGS. 3 and 4. FIG. 3 shows the expected current trajectory after the voltage is applied to the phase and a current threshold $I_t$, which is a small fraction of the expected peak current, e.g. 2-3%. FIG. 4 shows a logic circuit consisting of an AND gate 50 and a timer 52. The x and y inputs to the AND gate are driven by the gate signals of the switch(es) for the phase winding, e.g. the switches 21 and 22 of FIG. 2. When the controller decides to close both of these switches, the output of the AND gate enables the timer 52 which is being driven by a clock signal. The timer will therefore count up on output line Q. The RESET line of the timer is driven by the threshold current $I_t$, so that when the current passes the threshold, the timer output Q is held at zero. The controller therefore expects to see the counter output rising for an initial period, but thereafter being held at zero. If this does not happen, then it is likely that a fault has occurred, e.g. the current feedback signal has been lost, a switch has failed to close, etc.

This method has proved beneficial in many applications. However, one difficulty is that the value of the output Q which denotes a fault varies widely with the particular machine being controlled: a value corresponding to 50 μsec may be suitable for a small, high-speed machine, whereas a larger, slower machine may require a value of 30 msec. In addition, the current may be slow to rise for some legitimate reason, e.g. if the system voltage has fallen significantly, or if the rotor is in a position where the phase inductance is at a maximum. It is therefore difficult to choose a timer output value which reliably represents a fault condition.

The present invention is defined in the accompanying independent claims. Some preferred features are recited in the dependent claims.

According to one embodiment, there is provided a method of validating a signalling system of an electrical drive, comprising: monitoring a first signal indicative of the presence of a first parameter of the drive; monitoring a second signal indicative of the presence of a second parameter of the drive, which second parameter has a non-zero value only when the first parameter is present; and validating the signalling system if the first and second signals are present together.

Typical parameters are flux and current. It is also possible to use rotor position and current in an electrical machine as the first and second parameters.

In other embodiments, the parameters may be currents or fluxes from different phases of the machine or from phases of another machine operating in parallel.

It has been realised by the inventors that, in general, neither the phase flux nor the phase current, for example, can exist in isolation from each other. It follows that if the signals representing these quantities are examined, both should be present. If only one is present, it is likely that a fault has occurred.

In one particular form, a method is described including detecting a predetermined condition of the first signal indicative of a value of the first parameter, and validating the signalling system if the predetermined condition is met.

The method may include detecting a predetermined condition of the second signal indicative of a value of the second parameter and validating the signalling system if the predetermined condition is met.

The predetermined condition of the first parameter may be that the parameter exceeds a given threshold. The predetermined condition of the second parameter may be that the parameter exceeds a given threshold.

In certain situations, the validation of the signals may only be legitimately carried out within a specific part of the cycle of the electrical machine. Thus, in some embodiments the validation is limited to within a predetermined time or rotor angle after detecting the first or the second signal.

Embodiments of the invention extend to a system implementing the above methods.

The method and system of the invention are suited to any electrical machine with one or more separately energisable phases which are typically energised from a zero flux condition. It is particularly useful in a switched reluctance machine.

Figure 5:
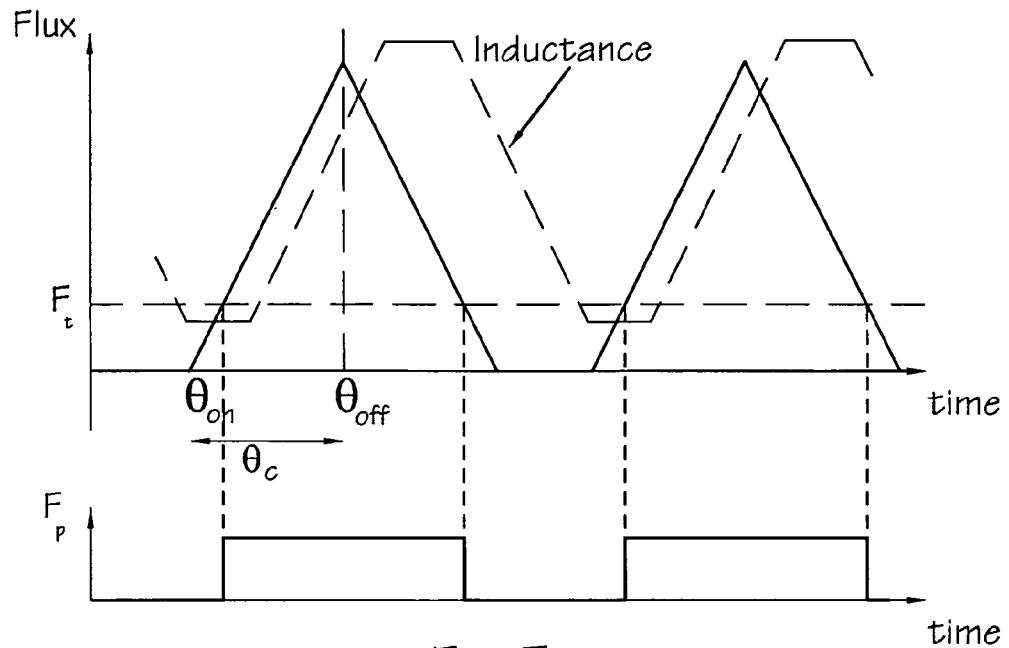
Figure 6:
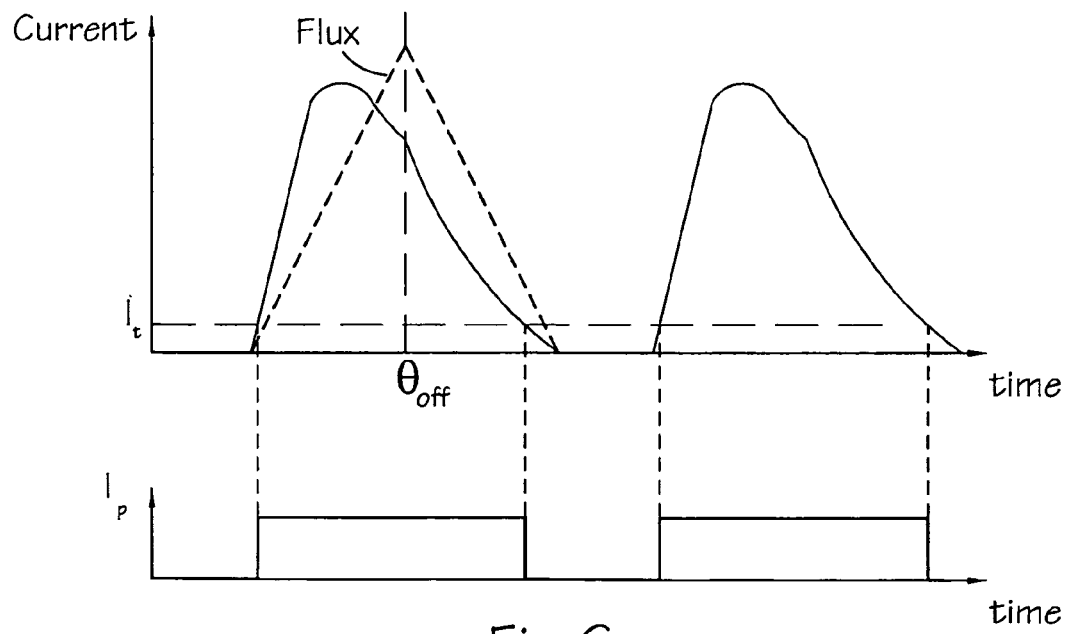
Figure 7:
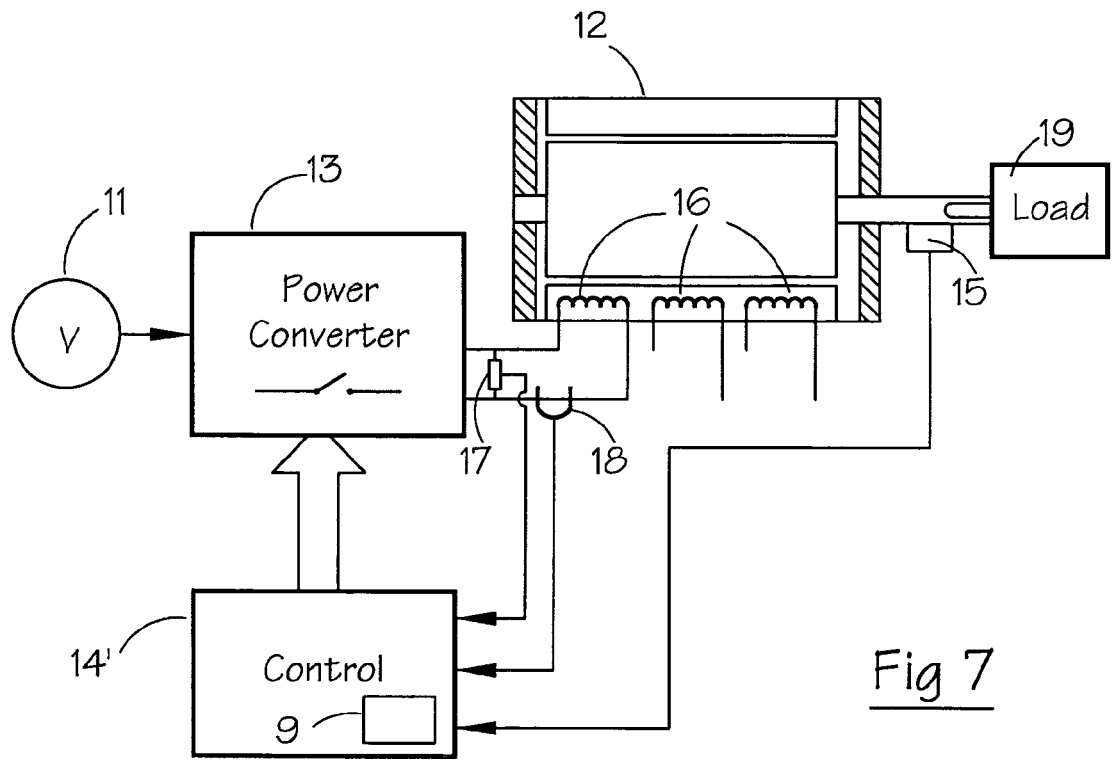
Figure 8:
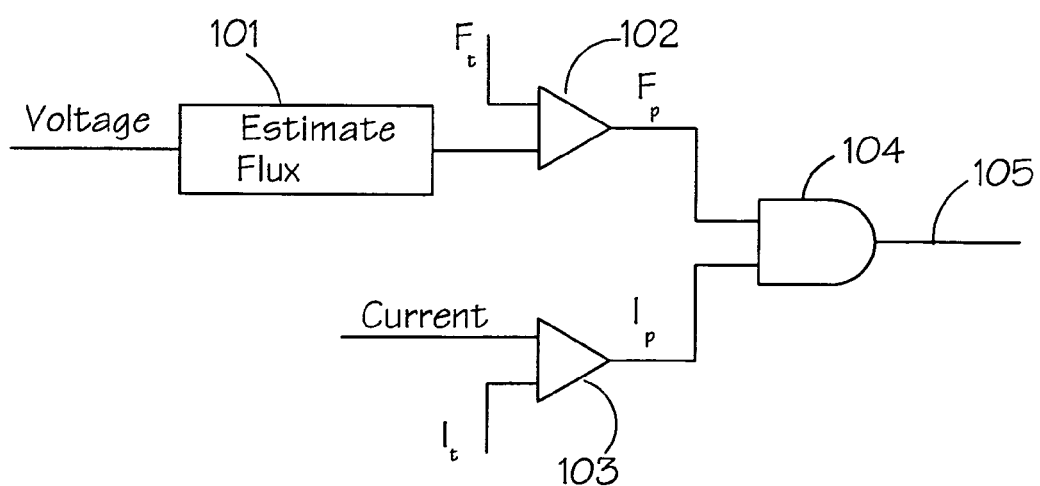
Figure 9:
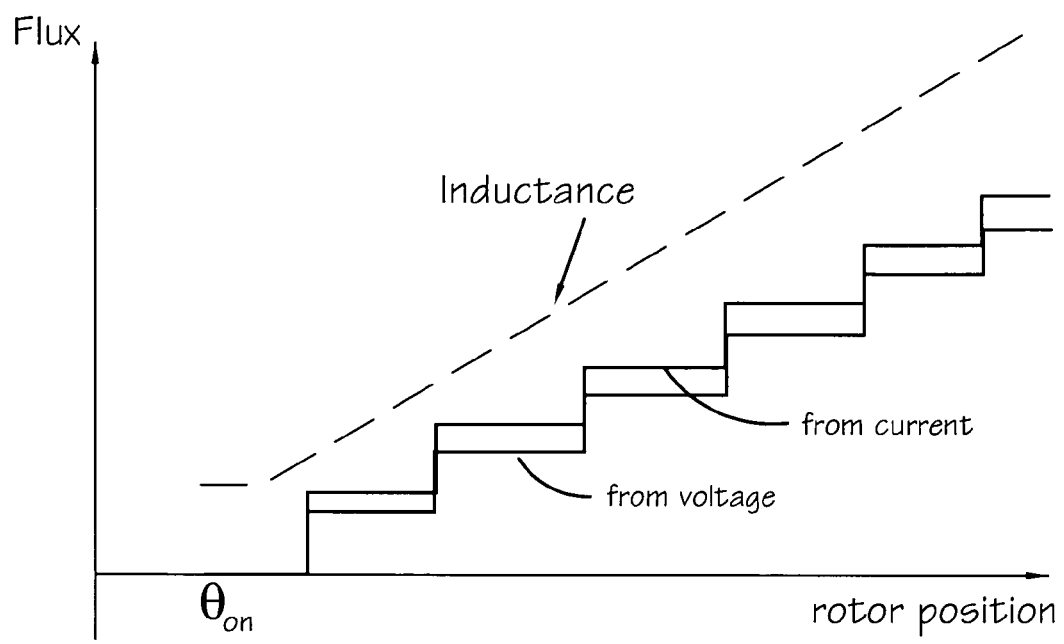

The invention can be put into practice in a number of ways, some of which will now be described by way of example and with reference to the accompanying drawings in which:

FIG. 1 shows a typical prior art switched reluctance drive;
FIG. 2 shows a known topology of one phase for the power converter of FIG. 1;
FIG. 3 shows a previous method of validating a current signal;
FIG. 4 shows part of a logic circuit for use with the current relationship of FIG. 3;
FIG. 5 shows flux and logic waveforms according to an embodiment;
FIG. 6 shows current and logic waveforms according to an embodiment;
FIG. 7 shows a switched reluctance drive according to a disclosed embodiment;
FIG. 8 shows a circuit illustrating part of the function of the drive of FIG. 7; and
FIG. 9 shows flux-linkage waveforms according to a further embodiment.

FIG. 5 shows a waveform of flux associated with one phase of a switched reluctance machine while operating in single-pulse mode. In the drawings and this description, the term "flux" is used for convenience. Those of ordinary skill in the art will recognise that the term "flux linkage" could equally well be used and that one quantity is simply a numerical scaling of the other. FIG. 5 is idealised in that, in the flux waveform, there is no non-linearity caused by voltage drop and no noise introduced by the method of measurement used to produce the waveform. Likewise, the inductance profile of the phase winding shown is also in idealised form. In practice, the corners of the profile are rounded due to flux fringing in the air and to saturation of the ferromagnetic paths.

In a typical drive system, the flux waveform would be computed as the time integral of a voltage signal, the voltage signal representing: the DC link voltage; the applied voltage at the terminals of the winding: the difference (v−ir), where v, i & r represent the instantaneous phase quantities of voltage, current and resistance; or some other signal which will yield a measure of flux to the required accuracy. FIG. 5 also shows a threshold value of flux $F_t$ and a logic signal $F_p$ which indicates when the flux has passed the threshold $F_t$.

FIG. 6 shows the current waveform corresponding to the flux waveform of FIG. 5 and, similarly, a logic signal $I_p$ which indicates when the current has crossed the threshold $I_t$.

The two logic signals $F_p$ and $I_p$ can now be compared and if the test indicates the presence of both signals, then the current feedback signal has been validated. If, however, the test indicates the presence of the $F_p$ signal without the presence of the $I_p$ signal, a fault is present and the appropriate action can be taken by the controller, e.g. to perform a controlled shut-down of the phase or of the whole drive. One advantage of this method of signal validation is that a current feedback signal is normally provided in the controller for protection of the semi-conductor switches and a flux signal is often available if, for example, the drive is being run by a "sensorless" position control scheme, so only logic or software level additions are required to implement the technique.

Another advantage of the method is that it is robust to large variations in DC link voltage. Since the flux in the machine is directly proportional to the voltage, any variation in voltage simply varies the slope of the flux waveform in FIG. 5 and, correspondingly, the slope of the current waveform in FIG. 6, but does not affect the value of the flux threshold, only the time taken to reach it. Thus, the test can still be carried out when suitable levels of flux and current are present in the machine.

While the threshold $F_t$ and the threshold $I_t$ do not, in principle, have restrictions on the values chosen (provided, of course, that they are within the operating values experienced by the drive system), various considerations have to be taken into account in a practical implementation. In general, most control systems are based around a digital system such as a microprocessor or a digital signal processor, which are inevitably driven by a system clock which defines the timings of sequences of operations. It is therefore appropriate to base embodiments of the invention on these timings. In certain situations, implementing the examination of the signals in a digital circuit requires some care and a recognition of quantisation effects which may be present in either signal.

For example, if the system clock allows decisions to be taken every 80 μsec, the control system could validate the current signal after, say, 240 μsec and continue to validate it every 80 μsec until validation is no longer required, e.g. when the switches are opened and control of the phase current is no longer possible. The reason for the delay after the phase is energised is to allow for any noise present on a low-level current signal to be disregarded, which might otherwise give rise to false readings and possibly cause the drive to shut down.

The amount of delay can be chosen from a consideration of the parameters of the drive. The skilled person will realise that the initial rate of current increase in the phase winding depends on the rotor position, as well as on the supply voltage. In the minimum inductance position, it is likely to be some 10 to 15 times faster than it would be in the maximum inductance position. Knowing the minimum inductance, the supply voltage and the maximum allowable current in the switch(es), the maximum time allowable for validating the current data can be determined, so that remedial action can be taken, if necessary, before damage occurs.

While this fixed value of delay is acceptable in many drive systems, it is possible to refine the technique to use a variable delay which is related to the position of the rotor (and hence the position on the inductance profile, as shown in FIG. 5) where a phase is energised. For example, an electric drive may also operate in a braking (generating) mode, firing the phase switches close to a maximum inductance position rather than close to a minimum inductance position as for a motoring mode.

With the position in the inductance profile of the firing angles known for a given mode, the delay between the start of energisation of a phase and the beginning of validation can be adjusted as a function of the position of energisation. Alternatively, the delay can be adjusted as a function of detected rotor position.

In the latter case, the degree of refinement available depends on the precision of the rotor position information provided in the drive system. For example, if a traditional rotor position transducer is used (as is typical of many drive systems), there are two transitions in the binary output in a cycle of each phase channel. For a typical 3-phase system, the phase signals can be combined to give rotor position within one sixth of an inductance cycle. This would allow three zones of inductance to be used to set three different delay times, rather than just using a constant value. If an encoder or resolver or some software equivalent were used, finer resolution of position would be available and so smaller steps of delay time would be possible. The benefit of these variable delay times is that tighter control of the drive system is achieved.

If the drive is operating very slowly in a chopping mode (see the Stephenson et al paper referenced above), the flux and current will be present for a relatively long time. Since the flux signal is an estimate derived by integration, there is a danger of the inherent drift in the integrator extending the apparent presence of flux and implying that flux is present after the current has decayed to zero. This can be avoided by setting a time limit, beyond which validation is not attempted. The time limit can be easily determined from a knowledge of the integrator characteristics and will generally be in a typical range of 50-100 msec.

FIGS. 7 and 8 show an embodiment of the invention in which the control unit 14' is similar to 14 of FIG. 1, except that it includes a component notionally indicated by numeral 9 and has an additional input of phase voltage from the voltage transducer 17. In FIG. 8, the process executed by the control unit 14' in component 9 is implemented in logic circuitry. The voltage input is used by circuitry 101 to provide an estimate of the phase flux. Such methods are well known in the art and are based on the time integral of voltage. The predetermined flux threshold $F_t$ is fed to a comparator 102 which provides the output $F_p$ when the flux estimate exceeds the flux threshold $F_t$. In a similar way, the measurement of phase current from the current transducer 18 is compared with the current threshold $I_t$ in comparator 103 to provide the output $I_p$. $F_p$ and $I_p$ are supplied to the AND gate 104 which produces a signal on line 105 when both flux and current are present. This is one example of the way in which the flux signal can be used to validate the signal from the current transducer. The hardware illustrated in FIG. 8 could be implemented in software to equal effect as will be readily apparent to one of ordinary skill in the art.

It will be clear from the above description that the method is not limited to validation of current signals. It is equally possible to use a current signal to validate a flux signal by setting the appropriate windows of parameter value or elapsed time, so that the integrity of the flux signal is validated. The examples described above illustrate how the integrity of a signal can be validated a number of times during a conduction cycle of an electrical drive. These embodiments are particularly beneficial when the drive is operating at relatively low speed. Where the cycle time of the system clock becomes significant with respect to the phase cycle time, other embodiments validate a signal once per phase cycle and are particularly useful at higher operating speeds. One such embodiment will now be described.

At higher speeds, it is normal to position the switch-on angle, at which the energisation of a phase is initiated, in advance of the minimum inductance position, so as to optimise the operation of the machine. Since the current should begin to rise after switch-on (whether the machine is operated in motoring or generating mode), the validation process can observe the instantaneous rotor position (whether provided from a hardware transducer or a software algorithm) and, when the minimum inductance position has been reached, test whether the current signal has crossed a predetermined threshold.

A further embodiment will now be described, in which the parameters are continuously compared and validated throughout the conduction cycle of the machine. In effect, this replaces the fixed thresholds (e.g. $F_t$, $I_t$) with a variable threshold. FIG. 9 shows a typical output from a software integrator which is computing the flux-linkage in a machine from a signal representing the supply voltage. The step-wise feature of this first signal is a result of the finite clock cycle of the control system.

Making use of the relationship between inductance, flux-linkage and current, ($L=\psi/i$) a second signal representing flux-linkage can be computed by taking the current feedback signal and multiplying it by the inductance corresponding to the known position. This second signal, if the control system is working correctly, should match the first signal, for example be within a margin of the first signal. If it does not, then it may be assumed that an error has occurred in one or other of the voltage or current feedback signals. To avoid spurious trips due to noise spikes, integrator drift, etc, a scaling factor can be applied to one or other of the signals, as shown in FIG. 9, to allow a safety margin before the validation process signals an error condition.

The advantage of this embodiment is that the feedback signals are monitored continuously during the conduction cycle, rather than just at the start of the cycle.

In other embodiments, the signals relate to parameters from different phases of the machine. For example, using the technique described above, currents from different phases can be compared. After allowing for the appropriate phase displacement, the comparison can allow the validation of the signals.

In yet further embodiments, the signals relate to parameters from different machines or different power converters operating simultaneously. For example, the signals can relate to two currents from different power converters which, in parallel, are supplying a single phase of a machine. By comparing the signals as shown above, the current sharing between the converters can be monitored and appropriate action taken if the current is unequally shared.

The skilled person will appreciate that the method may be applied with equal benefit to machines operating as motors or as generators and that variations of the disclosed arrangements are possible without departing from the invention, particularly in the details of the implementation of the algorithms in the controller in hardware, firmware and/or software. It will also be apparent that, while the technique has been described in relation to a switched reluctance machine, it can be used in relation to any electrical machine with independently supplied phases. Also, while the invention has been described in terms of a rotating machine the invention is equally applicable to a linear machine having a stator in the form of a track and a moving part moving on it. The word "rotor" is used in the art to refer to the movable part of both rotating and linear machines and is to be construed herein in this way. Accordingly, the above description of several embodiments is made by way of example and not for the purposes of limitation. It will be clear to the skilled person that minor modifications can be made to the control method without significant changes to the operation described above. The present invention is intended to be limited only by the scope of the following claims.

What is claimed is:

1. A method of validating a signalling system of an electrical drive, the method comprising: monitoring a first signal indicative of the presence of a first parameter of the drive; monitoring a second signal indicative of the presence of a second parameter of the drive, which second parameter has a non-zero value only when the first parameter is present; determining whether a predetermined condition indicative of the presence of the first and second signals is met; and in response to the determining that the predetermined condition is met, validating the signalling system to confirm the integrity of the first and second signals.

2. A method as claimed in claim 1 including selecting the predetermined condition to be the first and second signals being present together.

3. A method as claimed in claim 1 including selecting the predetermined condition to be that each of the signals exceeds a respective threshold.

4. A method as claimed in claim 1 including selecting one of the first and second signals to be indicative of current and the other one of the first and second signals to be indicative of flux in an electrical machine of the electrical drive.

5. A method as claimed in claim 1 including selecting each of the first and second signals to be indicative of flux in an electrical machine of the drive, one of the first and second signals being derived from a voltage signal and the other one of the first and second signals being derived from a current signal.

6. A method as claimed in claim 5 including selecting the predetermined condition to be the respective values of the first and second signals being within a margin of each other.

7. A method as claimed in claim 1 wherein the validating of the signalling system is carried out within a predetermined period of time after the predetermined condition has been met.

8. A method as claimed in claim 1 including configuring the electrical drive to have an operating cycle, and monitoring operation of the electrical drive and carrying out the validating of the signalling system at a predetermined point in the operating cycle.

9. A method as claimed in claim 1 including configuring the drive to include an electrical machine defining an inductance cycle, energising a phase of the machine at a position in the inductance cycle, starting the validating of the signalling system after a delay with respect to the energising of the phase, and determining a duration of the delay as a function of the position.

10. A signalling system for an electrical drive including an electrical machine, the system comprising: means for monitoring a first signal indicative of the presence of a first parameter of the drive; means for monitoring a second signal indicative of the presence of a second parameter of the drive, which second parameter has a non-zero value only when the first parameter is present; means for determining whether a predetermined condition indicative of the presence of the first and second signals is met; and means for validating the signalling system, to confirm the integrity of the first and second signals, in response to determining by the determining means that the predetermined condition is met.

11. A system as claimed in claim 10, in which the predetermined condition is the first and second signals being present together.

12. A system as claimed in claim 10 in which the predetermined condition is that each of the signals exceeds a respective threshold.

13. A system as claimed in claim 10 in which one of the first and second signals is indicative of current and the other one of the first and second signals is indicative of flux in the electrical machine of the electrical drive.

14. A system as claimed in claim 10 in which each of the first and second signals is indicative of flux in the electrical machine of the drive, one of the first and second signals being derived from a voltage signal and the other one of the first and second signals being derived from a current signal.

15. A system as claimed in claim 14 in which the predetermined condition is the respective values of the first and second signals being within a margin of each other.

16. A system as claimed in claim 10 including means for limiting validation of the signalling system to a predetermined period of time after the predetermined condition has been met.

17. A system as claimed in claim 10 in which the electrical drive has an operating cycle and the means for validating validates the signalling system at a predetermined point in the operating cycle.

18. A system as claimed in claim 10 in which the electrical machine defines an inductance cycle and the system includes means for energising a phase of the machine at a position in the inductance cycle; wherein the means for validating is arranged to start validating the signalling system after a delay with respect to the energisation of the phase; the means for validating further being arranged to determine a duration of the delay as a function of the position.

* * * * *